Jan. 21, 1964  E. B. MARJORAM  3,118,358
FILM ADVANCING MECHANISM
Filed July 24, 1962  2 Sheets-Sheet 1

INVENTOR:
Ernest B. Marjoram
Attorney

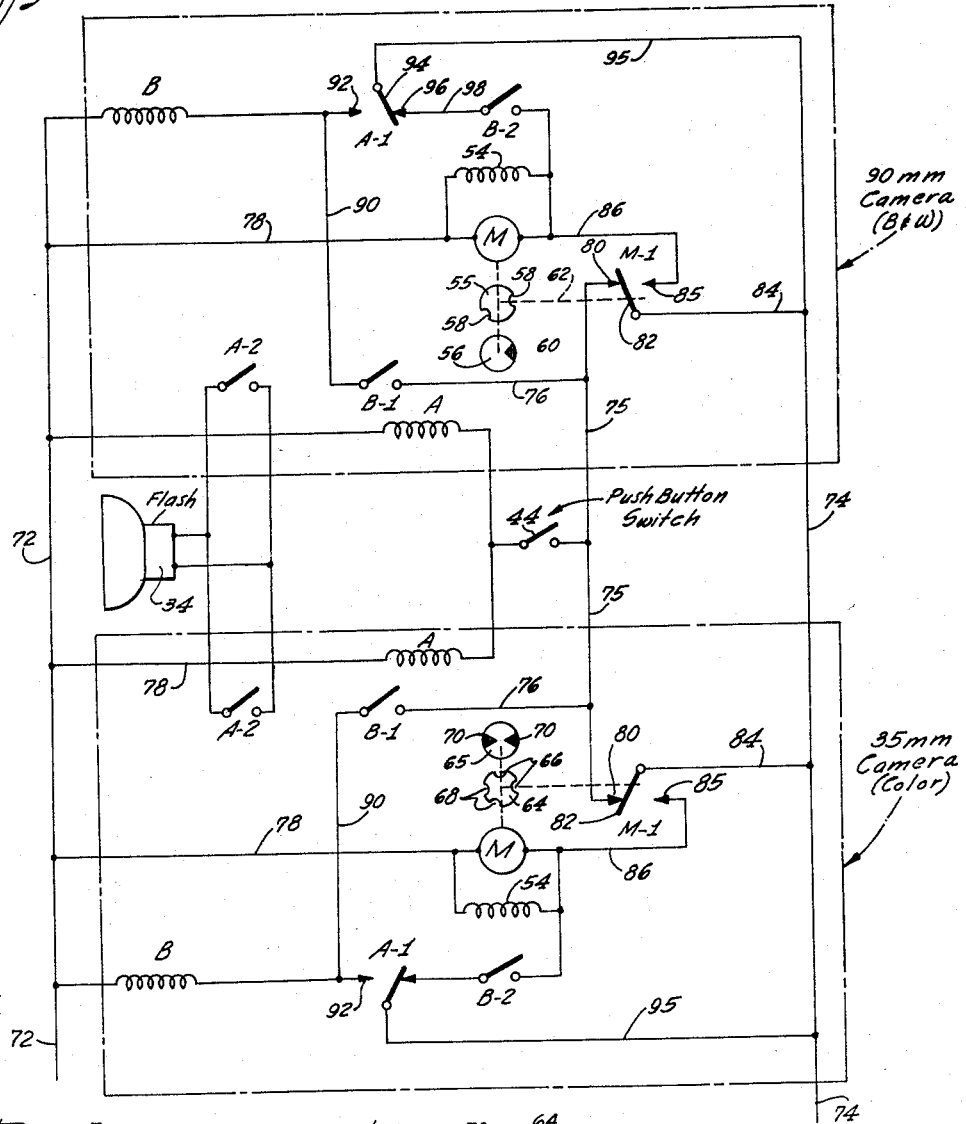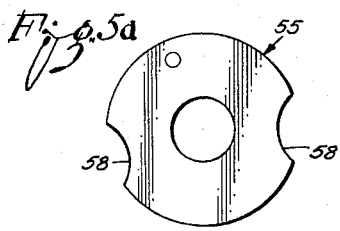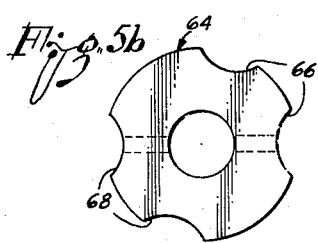

3,118,358
FILM ADVANCING MECHANISM
Ernest B. Marjoram, West Covina, Calif., assignor to Beattie-Coleman, Inc., Anaheim, Calif., a corporation of California
Filed July 24, 1962, Ser. No. 212,077
14 Claims. (Cl. 95—31)

This invention relates to a method of operation and means for carrying out the method of operation of photographic equipment for producing successive front and side views of successive subjects for future identification of the subjects. The invention has special utility for so-called police I.D. photography wherein a front view of each subject wearing a panel with a serial number is paired with a side view of the same subject. It has been the prevalent practice heretofore to take each pair of police I.D. photographs on 4 by 5 cut sheet film, the photographic procedure involving the steps of loading film holders, opening shutter and diaphragm to check focus, re-setting shutter and diaphragm, inserting film holder, pulling dark slide, replacing dark slide and removing film holder.

The present invention is directed to the problem of simplifying this procedure for increased reliability and for saving time. This problem is solved, in part, by using a camera loaded with a relatively large roll of film 90 mm. wide. It has been found to be satisfactory to reduce the size of the images to permit the use of 90 mm. film since only an unimportant lower margin of an image need be sacrificed. This simple substitution of roll film for cut films is not only economical but also eliminates the steps of loading and inserting a film holder as well as the steps of pulling and replacing a dark slide. The problem is solved in further part by using a reflex type camera with a matched auxiliary lens for focus adjustment to eliminate the steps of opening the shutter and diaphragm to check focus and of resetting the shutter and diaphragm.

The substitution of roll film for cut film does introduce the new problem, however, of avoiding confusion in the correct pairing of the front and side view photographs, a problem which does not exist when each pair is on a separate 4 x 5 cut film. Since the serial numbers of the subjects are seldom legible on the side view photographs and since quite often a given side view photograph appears to match two or three different front view photographs, the views cannot be reliably paired by inspection alone. If the photographer could be depended upon invariably to take the front view photograph first, theoretically the images could be paired by their sequence. Photographers do vary the sequence, however, and even if all the photographs were taken in the same sequence, the sequence is reversed when the film is turned over and a film may be inadvertently turned over when the pairs of images are cut apart.

The invention solves this problem by two special provisions. The first provision is the incorporation into the film-advancing mechanism of the camera of means to increase the spacing of the alternate successive pairs of images, the film being advanced only by a relatively small amount after one exposure to provide a narrow separation space between the two successive exposures and then being advanced by a greater amount after the next exposure to provide a wider separation space between the successive exposures. Thus the images appear in pairs with the pairs set off by spacing.

This provision alone does not solve the problem because the camera operation may be out of phase with the subjects, the front view of a given subject being in one pair of closely spaced images and the side view of the same subject being in the next pair. A second provision makes it possible for the photographer to know when he is operating in phase with the successive subjects. The second provision is the incorporation into the camera of signal means to indicate when the camera is set to make the first exposure of each pair of closely spaced exposures. With these two provisions, the photographer may take the front and side views of a subject in either order without any subsequent confusion about the correct pairing of images.

The preferred practice of the invention achieves further efficiency and time saving by using an electrically powered and controlled camera loaded with an exceptionally long roll of film. The photographer merely presses a button to operate the shutter and the film advancing mechanism automatically in sequence.

As described to this point, the invention solves the primary problem of providing correctly paired black and white photographs for police files as required both for printing posters and for sending photographs by wire. The preferred practice of the invention deals with the further problem of simultaneously producing a similar pair of smaller color transparencies, for example on 35 mm. color film. Color transparencies are desirable to reveal characteristics that are not recorded in black and white, color transparencies often resulting in positive identification instead of questionable identification. An important development in police work is the placing of the pairs of color transparencies on IBM cards which are punched to record the character and modus operandi of the subjects.

The requirement is to produce pairs of front views and side views of subjects on 35 mm. color film, with assurance of correct pairing of the color images, and assurance that a pair of color transparencies is produced for each pair of black and white photographs. This requirement is met by incorporating the previously mentioned two provisions in an electrically controlled 35 mm. camera of large film capacity and by interconnecting the 35 mm. camera and the 90 mm. camera for synchronous operation. Thus the photographer carries out the usual procedure of posing a subject and pressing a button for each exposure, the button being a switch for operating the two cameras simultaneously together with an associated electronic flash device. When either one of the two cameras is loaded with a new roll of film, the photographer checks to be sure that the two cameras are in phase as indicated by their respective phase signals and thereafter rechecks as necessary to be sure that the operation of the two cameras is in phase with the succession of subjects.

The features and advantages of the invention may be understood from the following detailed description and the accompanying drawings.

In the drawings, which are to be regarded as merely illustrative:

FIG. 5 is a wiring diagram of the control system for the two cameras; and FIGS. 5a and 5b are side elevational views of cams used in FIG. 5.

Figures 1, 2:
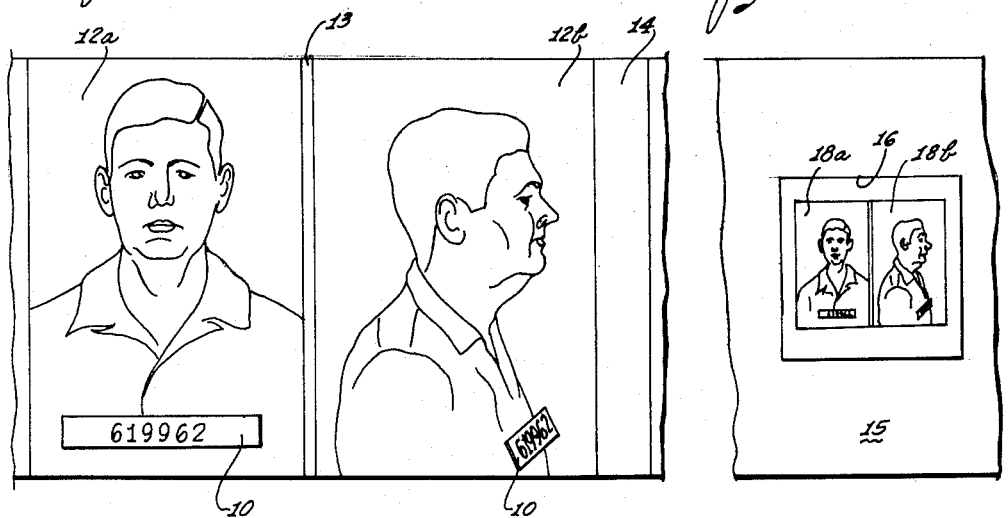
FIG. 1 is a face view of a pair of black and white negative photographs of a subject on a roll of 90 mm. film.
FIG. 2 is a face view of a portion of an IBM card provided with a pair of color transparencies corresponding to the black and white images in FIG. 1.

FIG. 1 shows a pair of photographs of a subject wearing a placard 10 with a serial number thereon, the pair of photographs comprising a front view photograph 12a in which the serial number is plainly visible and a side view photograph 12b of the same subject in which the serial number is not legible. It is to be noted that the pair of photographs of the same subject are separated by a narrow space 13, but the pair is separated from the next pair by a much wider space 14.

FIG. 2 shows a portion of an IBM card 15 with a window 16 therein containing a pair of transparencies corresponding to the black and white images of FIG. 1. The transparencies comprise a front view transparency 18a corresponding to the front view photograph 12a and a side view transparency 18b corresponding to the side view photograph 12b.

Figure 3:
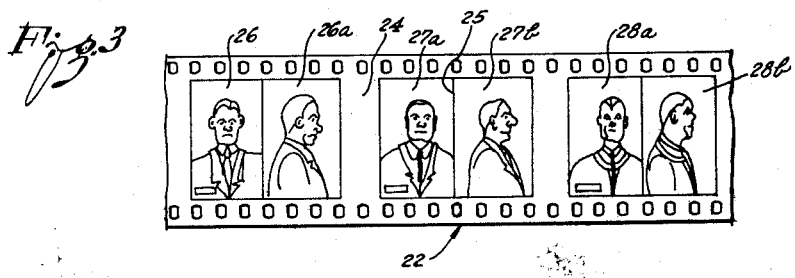
FIG. 3 is a face view of a portion of 35 mm. film showing how the successive images are spaced to form separate pairs corresponding to the separate subjects.

FIG. 3 shows a portion of a roll of 35 mm. film 22 with pairs of images spaced thereon in accord with the teaching of the invention. It will be noted that the images are arranged in pairs with spaces 24 of liberal width between the pairs and with very narrow or legible spaces 25 between the two images of each pair. Thus it is apparent at a glance that the two images 26a and 26b are front and side views of one subject, the two images 27a and 27b are front and side views of a second subject and the two images 28a and 28b are front and side views of a third subject, there being no possibility of confusion. There is no difficulty in matching the pairs of color transparencies with the pairs of black and white photographs by means of the front views showing the serial numbers on the placards carried by the subjects.

Figure 4:
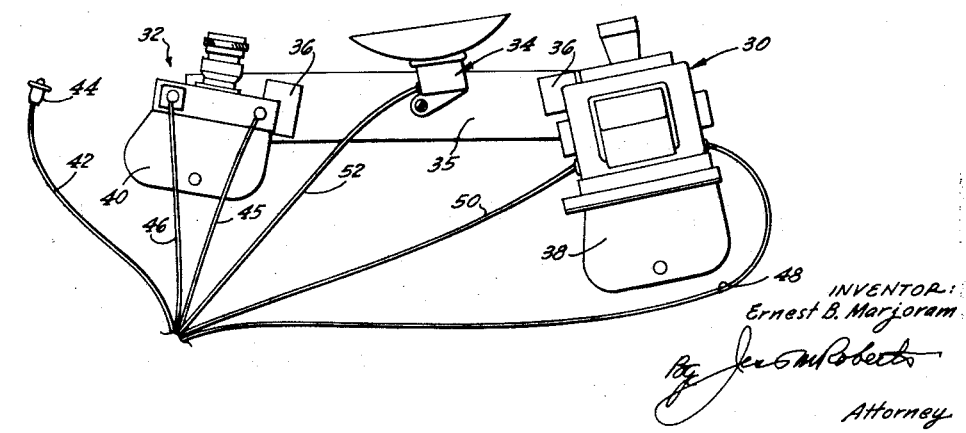
FIG. 4 is a plan view of a 90 mm. film camera and a 35 mm. film camera adapted for simultaneous operation in accord with the teachings of the invention.

FIG. 4 shows a 90 mm. camera 30 and a 35 mm. camera along with an electronic flash gun 34 all mounted on a common support plate 35, which support plate may, in turn, be mounted on a suitable tripod (not shown). Suitable corner blocks 36 may be mounted on the support plate 35 to serve as guide abutments for correctly positioning the cameras on the support plate with the cameras at correct angles relative to the support plate for focusing on a common subject at a selected distance. The 90 mm. camera 30 has a magazine 38 to contain a roll of film long enough, for example, to take 160 pairs of photographs and the 35 mm. camera may have a magazine 40 with a roll of film long enough to take as many as 800 pairs of photographs.

The two cameras 30 and 32 are operated by means of an electrical harness which includes a cable 42 carrying a pushbutton switch 44, a cable 45 for controlling the shutter of the 35 mm. camera, a cable 46 for controlling the film advancing mechanism of the 35 mm. camera, a cable 48 for controlling the shutter of the 90 mm. camera, a cable 50 for the film-advancing mechanism of the 90 mm. camera and a cable 52 for operating the electronic flash gun 34.

Referring to the wiring diagram in FIG. 5, each camera has a solenoid A for actuation of its shutter and each camera has a relay coil B to control the operation of a motor M for actuating the film-advancing mechanism of the camera. When a shutter solenoid A is energized it not only actuates the shutter of the camera but also functions as a relay coil to operate a single-pole double-throw switch A–1 and to close a normally open switch A–2 for operation of the flash gun 24. When the relay coil B of a camera is energized it closes two normally open switches B–1 and B–2.

The film-advancing motor M of each camera is in parallel with a coil 54 of an associated brake for the film-advancing mechanism, the brake being of a well known type which is normally effective and is released when the brake coil is energized simultaneously with the motor.

The motor of the 90 mm. camera drives the film and the film, in turn, drives a film control cam 55 and a phase signal disk 56. The control cam 55 which is best shown in FIG. 5a makes one revoluiton for each pair of exposures and has a pair of peripheral recesses 58 to control the spacing of the images on the film, the two recesses being of unequal circumferential spacing in accord with the desired unequal spacing of the successive images. The signal disk 56 is positioned at a window (not shown) of the camera and has a distinctive segment 60 which appears at the window to indicate that the camera is set for the first exposure of a pair of closely spaced exposures. When the first exposure is taken and the film is advanced for the second exposure the segment 60 disappears from the window. The segment 60 may, for example, be white with the remaining area of the signal disk black.

Operatively associated with the film control cam 55 is a single-pole double-throw switch M–1 which has the normal position shown in the diagram when one of the peripheral cam recesses 58 is at a control station, the operative connection between the cam and the switch being indicated by the dotted line 62.

In like manner the motor M of the 35 mm. camera actuates a film control cam 64 and an associated phase signal disk 65. The film control cam 64 which is best shown in FIG. 5b makes half a revolution for each pair of exposures and therefore has a first pair of peripheral recesses 66 and a second pair of peripheral recesses 68 with the recesses unevenly spaced for the desired uneven spacing of the successive images on the film. Since the phase signal disk 65 also makes half a revolution for each pair of exposures the disk has two signal segments 70 at diametrically opposite positions for indicating when the camera is set for the first exposure of a pair of exposures. A switch M–1 associated with the film control cam 64 is operated by the film control cam in the manner heretofore described.

The electrical harness for controlling and actuating the two cameras is adapted to be plugged into a 110 volt A.C. circuit and the two sides of this circuit are represented by the two leads 72 and 74 respectively in FIG. 5. One side of each of the two shutter solenoids A is connected to the lead 72 as shown and the other side is connected to one side of the previously mentioned pushbutton switch 44. The second side of the pushbutton switch 44 is connected by two wires 75 to fixed contacts 80 of the two switches M–1 respectively with branch wires 76 extending to one side of the two switches B–1 respectively.

The switch arms 82 of the two switches M–1 are connected to the second lead 74 by wires 84 respectively. The second fixed contact 85 of each of the two switches M–1 is connected to one side of the corresponding motor M and one side of the corresponding brake coil 54. The second side of the motor M and the second side of the brake coil 54 in each camera is connected to the lead 72 by a wire 78.

The second side of the switch B–1 in each camera is connected by a wire 90 to a fixed contact 92 of the corresponding switch A–1 and to one side of the corresponding relay coil B. The second side of the relay coil is connected to the lead 72.

The switch arm 94 of the switch A–1 in each camera is connected by wire 95 to the lead 74. The second fixed contact 96 of each of the switches A–1 is connected by wire 98 with one side of the corresponding switch B–2 and the second side of the switch B–2 is connected to the corresponding wire 86 and the corresponding side of the motor M.

The manner in which the invention operates to serve its purpose may be readily understood from the foregoing description. Closing of the pushbutton switch 44 results in energization of the two shutter solenoids A, one consequence being closing of the two normally open switches A–2 to cause the flash gun 34 to be operated by whichever switch closes first. Another consequence of energization of the two shutter solenoids A is actuation of the two corresponding switches A–1 to energize the two corresponding relay coils B.

The energization of each relay coil B closes the corresponding switch B–1 to form a holding circuit through switch M-1 to keep the relay coil energized independently of the switch A-1. Energization of the relay coil B also closes the corresponding switch B-2 but the motor M cannot be energized through the switch B-2 until the corresponding shutter solenoid A is de-energized to release the corresponding switch A-1.

When the pushbutton switch 44 is released to de-energize the two shutter solenoids A, switch A-1 returns to its normal position thereby cooperating with the closed switch B-2 to form a circuit through the motor M and the brake coil 54 of the camera. Initial operation of the motor M of each camera operates the corresponding switch M-1 to break the holding circuit for the corresponding relay coil B and the consequent de-energization of the relay coil B opens the two corresponding switches B-1 and B-2. The operation of each switch M-1 also serves to keep the corresponding motor M energized through the two wires 84 and 86. It is to be noted, furthermore, that the operation of each switch M-1 also makes it impossible for the pushbutton switch 44 to actuate a shutter solenoid A when the corresponding motor is running. When rotation of the film control cam in each camera brings a new peripheral cam recess into effective position to operate the corresponding switch M-1, the switch M-1 de-energizes the corresponding motor and causes the corresponding brake to be applied to stop the advance of the roll of film. The two cameras are then ready for repetition of the operating cycle.

My description in specific detail of the presently preferred practice of the invention will suggest various changes, substitutions and other departures from my disclosure within the spirit and scope of the appended claims. For example, while the two signal disks 56 and 65 of the two cameras respectively provide visual signals, audible signal means may be employed if desired.

I claim:

1. In a camera for use with roll film for photographing successive front and side views of successive subjects for future identification of the subjects, a film transport mechanism for advancing the film,
    said mechanism having an operating cycle of two stages for two successive exposures of the roll of film,
    one of said stages being relatively short for close spacing of two successive exposures on the film,
    the other stage being longer for greater spacing of two successive exposures on the film whereby the side and front view images of the subjects are arranged on the film in pairs corresponding to the subjects with greater spacing between the pairs of images than between the images of each pair to reveal at a glance which side views belong with which front views.

2. In a camera for use with roll film for photographing successive front and side views of successive subjects for future identification of the subjects, the combination of:
    a film transport mechanism for advancing the film,
    said mechanism having an operating cycle of two stages for two successive exposures of the roll of film,
    one of said stages being relatively short for close spacing of two successive exposures on the film,
    the other stage being longer for greater spacing of two successive exposures on the film whereby the side and front view images of the subjects are arranged on the film in pairs corresponding to the subjects with greater spacing between the pairs of images than between the images of each pair to reveal at a glance which side views belong with which front views; and
    indicating means operatively connected to said mechanism for indicating the different stages of said cycle.

3. A combination as set forth in claim 2 in which said indicating means is a visual signal means.

4. A combination as set forth in claim 2 in which said camera has a window for observation of said signal means therethrough.

5. In an apparatus for making relatively large pairs of successive front and side view identification photographs of successive subjects and corresponding relatively small pairs of photographs of the same subjects, the combination of:
    a first camera adapted for exposing relatively wide roll film and
    a second camera adapted for exposing relatively narrow roll film;
    a shutter-operating mechanism in each camera to expose the film therein;
    a film transport mechanism in each camera to advance the film therein after each exposure alternately by relatively small amounts and relatively large amounts to form successive pairs of images with the images of each pair relatively close together on the film and with the successive pairs of images spaced substantially further apart on the film to reveal at a glance which images are proper pairs;
    actuating means in each camera to operate the two mechanisms therein in succession for an operating cycle to expose a portion of the film in the camera; and
    control means common to the two cameras to energize the two actuating means concurrently for carrying out concurrent operating cycles in the two cameras.

6. A combination as set forth in claim 5 which includes flash means responsive to at least one of said two shutter-operating mechanisms.

7. In an apparatus for making relatively large pairs of successive front and side view identification photographs of successive subjects and corresponding relatively small pairs of photographs of the same subjects, the combination of:
    a first camera adapted for exposing relatively wide roll film and
    a second camera adapted for exposing relatively narrow roll film;
    a shutter-operating mechanism in each camera to expose the film therein;
    a film transport mechanism in each camera to advance the film therein after each exposure alternately by relatively small amounts and relatively large amounts to form successive pairs of images with the images of each pair relatively close together on the film and with the successive pairs of images spaced substantially further apart on the film to reveal at a glance which images are proper pairs;
    actuating means in each camera to operate the two mechanisms therein in succession for an operating cycle to expose a portion of the film in the camera;
    control means common to the two cameras to energize the two actuating means concurrently for carrying out concurrent operating cycles in the two cameras; and
    signal means on each camera responsive to the film transport mechanism of the camera to indicate whether each exposure is the first or second exposure of a pair for guidance in synchronously interlocking the actuating means of the two cameras by the common control.

8. A combination as set forth in claim 7 in which said signal means comprises a visual means.

9. A combination as set forth in claim 7 in which each of the two cameras has a window for observation of the corresponding signal means.

10. In an apparatus for making relatively large pairs of successive front and side view identification photographs of successive subjects and correspondingly relatively small pairs of photographs of the same subjects, the combination of:
    a first camera adapted for exposing relatively wide roll film and
    a second camera adapted for exposing relatively narrow roll film;

an electro-responsive shutter mechanism in each camera to expose the film therein;

control means common to the two cameras for simultaneous initiation of operation of the two shutter mechanisms;

an electro-responsive film-transport mechanism in each camera to advance the film therein;

a motor included in said film-transport mechanism of each camera for actuation thereof, said motor being responsive to the shutter mechanism of the camera for starting operation after the film is exposed;

means for each camera responsive to the motor of the camera to make said control means ineffective for shutter-mechanism operation while the motor is running;

film-metering means for each camera operated by the motor therein to space apart the images on the film therein, said metering means having a cycle comprising a first relatively short stage for close spacing of two successive images and a succeeding relatively long stage for greater spacing of two successive images; and means responsive to said metering means to de-energize the motor at the end of each stage.

11. A combination as set forth in claim 10 which includes means operatively connected with said metering means to indicate and distinguish said two stages for guidance in synchronizing the two cameras.

12. A combination as set forth in claim 10 which includes an electronic flash responsive to operation of either of said shutter mechanisms to cause the electronic flash to be operated by whichever shutter mechanism operates first.

13. In an apparatus for making relatively large pairs of successive front and side view identification photographs of successive subjects and correspondingly relatively small pairs of photographs of the same subjects, the combination of:

a first camera adapted for exposing relatively wide roll film and a second camera adapted for exposing relatively narrow roll film, each of said two cameras having a shutter mechanism, a solenoid to actuate the shutter mechanism, a film-transport mechanism and motor to actuate the film-transport mechanism;

a film-metering means in each camera operated by the motor therein to space apart the images on the film, said metering means having a cycle comprising a first relatively short stage for closer spacing of two successive images and a succeeding second relatively long stage for greater spacing of two successive images;

a normally open manually operable switch common to the two cameras for simultaneous energization of said solenoids of the two cameras;

means in each camera responsive to the corresponding solenoid to prevent operation of the corresponding motor while the solenoid is energized;

means to energize the motor in each camera in response to opening of said manual switch and to deenergize the motor in response to completion of a stage by said metering means; and means in each camera to prevent energization of the solenoid therein while the motor therein is energized.

14. A combination as set forth in claim 13 which includes means in each camera operatively responsive to the film-metering means therein to indicate the different stages of the film-metering means for guidance in synchronizing the stages of the two film metering means of the two cameras.

References Cited in the file of this patent
UNITED STATES PATENTS

| | | |
|---|---|---|
| 2,987,976 | Martin | June 13, 1961 |
| 3,007,385 | Fukuoka | Nov. 7, 1961 |
| 3,064,522 | Fukuoka | Nov. 20, 1962 |